United States Patent Office 3,564,012
Patented Feb. 16, 1971

1

3,564,012
5,7-DIMETHOXY-TRYPTAMINES
James M. McManus, Old Lyme, Conn., assignor to Chas. Pfizer & Co., Inc., New York, N.Y., a corporation of Delaware
No Drawing. Filed Mar. 29, 1968, Ser. No. 717,409
Int. Cl. C07d 27/56
U.S. Cl. 260—326.15          8 Claims

ABSTRACT OF THE DISCLOSURE

Certain novel 5,7-dimethoxytryptamine compounds have been prepared and found to be useful as oral hypoglycemic agents. Typical member compounds include 3 - (2-aminoethyl)-5,7-dimethoxyindole, 3-(2-aminopropyl)-5,7-dimethoxyindole and 3-(2-aminobutyl)-5,7-dimethoxyindole, and their pharmaceutically acceptable acid addition salts. Alternate routes of preparation for these compounds are presented and some of these routes are described in detail.

BACKGROUND OF THE INVENTION

This invention relates to new and useful tryptamine compounds, which are effective in reducing blood sugar levels. More particularly, it is concerned with certain novel 5,7-dimethoxytryptamines and their pharmaceutically acceptable acid addition salts, which are useful as oral hypoglycemic agents for lowering the blood sugar levels of diabetic subjects.

In the past, various attempts have been made by investigators in the field of organic medical chemistry to obtain new and useful oral hypoglycemic agents. For the most part, these efforts have involved the synthesis and testing of various novel sulfonylurea compounds and/or compounds that are in some way related in structure to the sulfonylureas, such as the sulfamylureas. However, in the search for still newer and better oral hypoglycemic agents, very little is known about the activity of non-sulfonylureas and this is particularly true in the case of various tryptamine-type compounds. For instance, the closest prior art is disclosed in British Patent Nos. 974,893, 974,894 and 974,895 where 5-methoxy and 7-methoxytryptamines are revealed to be useful as analeptic agents.

SUMMARY OF THE INVENTION

In accordance with the present invention, it has now been found that certain select novel 5,7-dimethoxytryptamine compounds, i.e., non-sulfonylureas, are surprisingly extremely useful (unlike the aforementioned monomethoxytryptamines) when employed as oral hypoglycemic agents for the treatment of diabetic subjects. The novel compounds of this invention are all selected from the group consisting of indole bases of the formula:

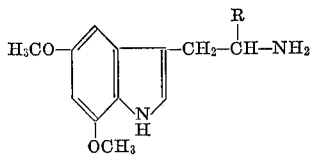

2 and the mineral and organic acid addition salts thereof, wherein R is a member selected from the group consisting of hydrogen and alkyl having from one to three carbon atoms. Compounds specifically embraced by this invention include 3-(2-aminoethyl)-5,7-dimethoxyindole, 3-(2-aminopropyl)-5,7-dimethoxyindole and 3-(2-aminobutyl)-5,7-dimethoxyindole and their pharmaceutically acceptable acid addition salts, such as the hydrochlorides. These compounds are all useful in lowering blood sugar levels when administered by the oral route of administration.

DETAILED DESCRIPTION OF THE INVENTION

In accordance with the process employed for preparing the novel compounds of this invention, 5,7-dimethoxyindole-3-carboxaldehyde is first contacted with the appropriate 1-nitroalkane compound in the presence of a Knovanagel-Walter type catalyst [Chemische Berichte, vol. 37, p. 4502 (1904)] in order to form the corresponding nitro-olefin as the desired condensation product. The latter intermediate is then reduced to the completely saturated amine under mild conditions by the use of lithium aluminum hydride or a complex oxidizable metal borohydride, such as a complex sodium, potassium or lithium borohydride with aluminum chloride, in accordance with any number of conventional organic procedures previously described in the literature [e.g., Nystrom et al., Journal of the American Chemical Society, vol. 70, p. 3738 (1948)] or by the use of standard catalytic hydrogenation techniques. Still other pertinent reaction procedures in this connection involve the use of Raney nickel [Annalen der Chemie, vol. 571, p. 201 (1951)] and the like for reduction purposes.

In accordance with a more specific embodiment of the process of this invention, the condensation reaction between 5,7-dimethoxyindole-3-carboxaldehyde and the 1-nitroalkane of from one to four carbon atoms is generally carried out by merely mixing the two reactants together at room temperature in approximately equimolar proportions, although a slight excess of one or the other reagents is not harmful in this respect. As previously indicated, a catalytic amount of basic condensing agent, such as a primary or secondary alkylamine, a cycloalkylamine or an alkali metal hydroxide, etc., is ordinarily employed in order to successfully effect this particular reaction. In general, about a one-tenth molar equivalent of the catalyst has been found to afford more than satisfactory results. Although the condensation reaction usually takes place at room temperature under these conditions, it is often more desirable to conduct said reaction at an elevated temperature in an inert organic solvent medium in which both the reactants and the catalyst are mutually miscible. Preferred reaction-inert solvents for use in this connection include methanol, ethanol, isopropanol, n-butanol, benzene, toluene, xylene, and the like. In practice, it is most convenient to reflux the two reactants together in a solvent of the aforementioned type in the presence of the catalyst for a period of about five to thirty hours, although any reaction temperature in the range of about 25° C. up to the boiling point of the solvent, i.e., up to about 150° C., is generally most feasible provided that the reaction is conducted for a period of about four hours to about two weeks. The condensation product obtained in this manner is usually best isolated from the reaction mixture by concentrating said solution under reduced pressure and then fractionally distilling the residual liquid in vacuo.

The second reaction step of the process involves the reduction of the nitroolefin intermediate with lithium aluminum hydride or with one of the aforementioned borohydried complexes in a reaction-inert organic solvent medium to afford the desired saturated amine compound, i.e., the 5,7-dimethoxytryptamine, in the form of a complex salt, which is then subsequently decomposed by the slow dropwise addition of water or any other commonly used aqueous system for these purposes that is of a slightly basic pH in nature like aqueous disodium tartrate solution, for example. This particular type reduction step is best carried out in an ethereal solvent medium at a temperature that is normally in the range of from about 0° C. to about 120° C. or at least up to about the reflux temperature of the reaction mixture if the boiling point of the solvent employed is below the upper limit of the aforesaid range. Preferred ethereal solvents for use in this connection include diethyl ether, di-isopropyl ether, di-n-butyl ether, tetrahydrofuran, dioxane and dimethylcellosolve. Recovery of the desired product from the resulting ethereal layer can then be effected by any number of standard procedures after decomposition of the aforesaid complex salt has already taken place. For instance, the thoroughly washed and dried ethereal layer can be concentrated under reduced pressure to afford the crude product as residual material, which is then purified as such by means of recrystallization from a suitable solvent such as toluene or else simply converted to the desired acid addition salt as will be more fully explained hereinafter.

Moreover, it is also possible to convert the aforementioned nitroolefin intermediate directly to the corresponding fully saturated amine compound via catalytic hydrogenation in a reaction-inert organic solvent medium, as previously indicated. This reaction is ordinarily conducted in a lower alkanoic acid such as formic acid, acetic acid, propionic acid, and the like, or in a lower alkanol such as methanol, ethanol, isopropanol, and so forth, although solutions consisting of mixtures of the two solvent types, as well as the esters they form with one another, have also been found highly desirable for the present purposes at hand. Preferred solvent mixtures in this connection comprise from about one part by volume of acid to about two to ten parts by volume of alkanol, while preferred esters include methyl formate, ethyl acetate, methyl propionate, isoamyl acetate, and the like. Although any standard catalyst for hydrogenation purposes may be used, it is preferable to employ such noble metal catalysts as ruthenium, platinum and palladium, etc., in order to ensure completeness of reaction. Specific examples of such type catalysts in their various forms include ruthenium-on-charcoal, platinum-on-charcoal, palladium-on-charcoal, and so forth. In general, the hydrogenation reaction is conducted at a temperature of from about 0° C. to about 100° C. and at a pressure that may vary anywhere from about 10 p.s.i.g. to about 3,000 p.s.i.g. of hydrogen. Completion of the hydrogenation reaction is usually signified by the termination of any further hydrogen uptake and this, in turn, normally requires from about two to four hours. Recovery of the saturated amine product, viz., the 5,7-dimethoxytryptamine, from the reaction mixture is then readily accomplished by first removing the catalyst therefrom by means of filtration, followed by adjusting the pH of the resulting filtrate to a basic pH value and thereafter extracting the so obtained basic aqueous solution with a water-immiscible organic solvent, such as a lower dialkyl ether or a halogenated hydrocarbon. Alternatively, it is also possible to first remove the aforementioned reaction solvent from the filtrate by means of evaporation under reduced pressure and then to partition the residual liquid between the water-immiscible organic solvent and a dilute basic aqueous solution like 10% aqueous sodium hydroxide, for example. In either case, the desired tryptamine product is easily obtained by isolating same from the solvent extract via concentration under reduced pressure or else by first converting said base product in situ to the corresponding hydrohalide acid addition salt, which is then precipitated from solution.

Other methods of which can be used here to prepare the novel compounds of this invention include routes not involving the use of 5,7-dimethoxyindole-3-carboxaldehyde and these are as follows, viz, (1) the reaction of 3-dimethylaminomethyl-5,7-dimethoxyindole with an appropriate nitroalkane compound, followed by reduction with lithium aluminum hydride in the usual fashion to afford the desired 5,7-dimethoxytryptamine; and (2) the reaction of 5,7-dimethoxyindole with oxalyl chloride, followed by treatment of the resulting acid chloride intermediate with dibenzylamine and then reducing with lithium aluminum hydride, followed by a subsequent debenzylation step to form 5,7-dimethoxytryptamine itself. Of these two alternate routes, the more preferred one is obviously the first-mentioned process dealing with the use of 3-dimethyl-aminomethyl-5,7-dimethoxyindole as starting material for the reaction, since it leads to the production of various member compounds of this invention, whereas the second method is only appropriate for preparing tryptamines with no substituent groups on the aliphatic side chain (like 5,7-dimethoxytryptamine).

Inasmuch as the 5,7-dimethoxytryptamine compounds of this invention are basic compounds, they are capable of forming a wide variety of salts with various mineral and organic acids. Although such salts must be pharmaceutically-acceptable when the final products are intended for oral consumption, it is possible to first isolate the desired 5,7-dimethoxytryptamide compounds from the reaction mixture as a pharmaceutically unacceptable salt and then to subsequently convert the latter, as indicated previously, to the free base compound by treatment with an alkaline reagent, followed by the final conversion to the pharmaceutically acceptable acid salt in the manner hereinafter indicated. For instance, the acid addition salts of the 5,7-dimethoxytryptamine compounds of this invention may be prepared by treating the base compound with a substantially equimolar amount of the chosen acid. The salt-formation step can be carried out in an aqueous solution or in a suitable organic solvent such as methanol or ethanol. Upon careful evaporation of the solvent, the solid salt is obtained.

The acids which are used to prepare the pharmaceutically acceptable acid addition salts of the aforementioned 5,7-dimethoxytryptamine bases of this invention are those which form non-toxic acid addition salts containing pharmaceutically acceptable anions, such as the hydrochloride, hydrobromide, hydriodide, nitrate, sulfate or bisulfate, phosphate or acid phosphate, acetate, lactate, citrate or acid citrate, tartrate or bitartrate, succinate, maleate, gluconate, saccharate, methanesulfonate, ethanesulfonate, benzenesulfonate and p-toluenesulfonate salts.

As previously indicated, the 5,7-dimethoxytryptamine compounds of this invention are all readily adapted to thereapeutic use as oral hypoglycemic agents in view of their ability to lower the blood sugar levels of diabetic subjects. For instance, 3-(2-aminopropyl)-5,7-dimethoxyindole as a hydrochloride salt has shown good hypoglycemic activity in the normal fasted rat, as well as in the mildy alloxanized rat and in the normal fasted dog, with pronounced hypoglycemia being observed in the latter animal at dose levels ranging from about 5 mg./kg. to 20 mg./kg. Additionally, none of these compounds causes any serious unwanted side effects to occur in the subjects to whom they are so administered, i.e., no problems of toxicity or any other untowards side effects of either a gross or microscopic pathological nature are encountered with these compounds when they are orally administered in the manner indicated above.

In accordance with a method of treatment of the present invention, the herein described hypoglycemically effective 5,7-dimethoxytryptamines can be administered to a diabetic subject via the oral route of administration. In general, these compounds are most desirably administered in doses ranging from about 25 mg. up to about 1.0 g. per day, although variations will still necessarily occur depending upon the weight of the subject being treated. However, a dosage level that is in the range of from about 0.4 mg. to about 15 mg. per kg. of body weight per day is most desirably employed in order to achieve effective results. Nevertheless, it is still to be appreciated that other variations may also occur in this respect, depending upon the species of animal being treated and its individual response to said medicament, as well as on the particular type of oral pharmaceutical formulation chosen and the time period and interval at which such administration is carried out. In some instances, dosage levels below the lower limit of the aforesaid range may be more than adequate, while in other cases still larger doses may be employed without causing any harmful or deleterious side effects to occur provided that such higher dose levels are first divided into several smaller doses that are to be administered throughout the day.

In connection with the use of 5,7-dimethoxytryptamine compounds of this invention for the treatment of diabetic subjects, it is to be noted that they may be administered either alone or in combination with pharmaceutically acceptable carriers and that such administration can be carried out in both single and multiple dosages. More particularly, the novel compounds of the invention can be administered in a wide variety of different dosage forms, i.e., they may be combined with various pharmaceutically-acceptable inert carriers in the form of tablets, capsules, lozenges, troches, hard candies, powders, sprays, aqueous suspensions, elixirs, syrups, and the like. Such carriers include solid diluents or fillers, sterile aqueous media and various non-toxic organic solvents, etc. Moreover, such oral pharmaceutical compositions can be suitably sweetened and/or flavored by means of various agents of the type commonly employed for just such a purpose. In general, the therapeutically effective compounds of this invention are present in such dosage forms at concentration levels ranging from about 0.5% to about 90% by weight of the total composition, i.e., in amounts which are sufficient to provide the desired unit dosage.

In the latter connection, the compounds of this invention may be administered in suitable unit dosage forms which will preferably contain at least about 5 mg. per dosage unit, although concentration levels in the range of from about 5 mg. to about 250 mg. per unit dosage per day may be employed to advantage. When larger doses of these hypoglycemic agents are to be employed, it is preferable to administer two more unit doses at various time intervals, adjusting, if necessary, the content of the antidiabetic agent per unit dosage from accordingly. Moreover, multiple dose treatment has indicated the feasibility, in some instances, of administering the 5,7-dimethoxytryptamine containing compositions at periodic time intervals, e.g., by orally administering the hypoglycemic agent to an afflicted subject at a dosage level that is in the range of approximately 0.200–1.0 g. per day, divided into about two to about five doses of equal strength that are to be administered throughout the day. Furthermore, optimum results can often be achieved in such cases by administering a higher dose initially, followed by the administration of a maintenance dose of therapy at a lower dosage thereafter, e.g. 1.0 g. the first day, 0.6 g. the second day, 0.4 g. the third day and 0.2 g. per day thereafter.

For purposes of oral administration, tablets containing various excipients such as sodium citrate, calcium carbonate and dicalcium phosphate may be employed along with various disintegrants such as starch and preferably potato or tapioca starch, alginic acid and certain complex silicates, together with binding agents such as polyvinylpyrrolidone, sucrose, gelatin and acacia. Additionally, lubricating agents such as magnesium sterarate, sodium lauryl sulfate and talc are often very useful for tabletting purposes. Solid compositions of a similar type may also be employed as fillers in soft and hard-filled gelatine capsules; preferred material in the connection would also include the high molecular weight polyethylene glycols. When aqueous suspensions and/or elixirs are desired for oral administration, the essential active ingredient therein may be combined with various sweetening or flavoring agents, coloring matter or dyes and, if so desired, emulsifying and/or suspending agents, as well, together with such diluents as water, ethanol, propylene glycol, glycerin and various like combinations thereof.

This invention is still further illustrated by the following examples, which are not to be construed in any way or manner as imposing limitations upon the scope thereof. On the contrary, it is to be clearly understood that resort may be had to various other embodiments, modifications and equivalents thereof which readily suggest themselves to those skilled in the art without departing from the spirit of the present invention and/or the scope of the appended claims.

Example I

To a solution consisting of 66.0 g. (0.370 mole) of 5,7-dimethoxyindole dissolved in 350 ml. of dimethylformamide that had previously been cooled to 20° C., there were added 59.6 g. (0.370 mole) of phosphorus oxychloride in 400 ml. of the same said solvent over a period of twenty minutes, while maintaining the temperature of the reaction mixture at 22–28° C. throughout the course of the addition. The resulting mixture was then allowed to stir at room temperature ($\sim$25° C.) for a period of one-half hour, followed by the addition of same to a mixture consisting of 6.5 liters of ice and water and also containing 148 ml. of 20% aqueous sodium hydroxide. After stirring for 15 additional minutes and filtering, the filtrate was collected and subsequently adjusted to a pH of 10.5 with 20% aqueous sodium hydroxide solution. The resulting yellow precipitate, which formed at this point, was then further stirred in the aqueous alkaline medium for a period of thirty minutes, followed by its subsequent removal by means of suction filtration. After air-drying to constant weight, there were obtained 45.7 g. of 5,7-dimethoxyindole-3-carboxaldehyde, M.P. 128–129° C. Recrystallization of the latter material from benzene then raised the melting point to 149–150° C.

Analysis.—Calcd. for $C_{11}H_{11}O_3N$ (percent): C, 64.39; H, 5.40; N, 6.82. Found (percent): C, 64.44; H, 5.52; N, 6.83.

Example II

A mixture consisting of 10 g. of 5,7-dimethoxyindole-3-carboxaldehyde and 2 g. of ammonium acetate in 65 ml. of nitroethane was heated on a steam bath for a period of two hours. The reaction mixture was then cooled to room temperature ($\sim$25° C.) and then added to 300 ml. of isopropyl ether, whereupon precipitation of the desired product from solution soon occurred. The resulting solids were then collected by suction filtration, washed with water and air-dried to give 7.8 g. of 3-(2-methyl-2-nitrovinyl)-5,7 - dimethoxyindole, M.P. 186–188° C. (M.P. 186.5–187.5° C. after recrystallization from toluene).

Analysis.—Calcd. for $C_{13}H_{14}O_4N_2$ (percent): C, 59.53; H, 5.38. Found (percent): C, 60.07; H, 5.49.

One gram of the above nitrovinylindole compound in 25 ml. of tetrahydrofuran was then added dropwise to a suspension of 868 mg. of lithium aluminum hydride in 20 ml. of the same said solvent. The resulting mixture was then stirred at room temperature ($\sim$25° C.) for one hour, followed by careful treatment with water. The solids which formed at this point were then collected by means of suction filtration and the resulting filtrate subsequently concentrated in vacuo to afford a partially crystalline residue. The latter material was then dissolved in diethyl ether and treated with hydrogen chloride in ethyl acetate to give 450 mg. of 3-(2-aminopropyl)-5,7-dimethoxyindole hydrochloride, M.P. 271–273° C.

Example III

The procedure described in the previous example was employed once again, only this time using 15.6 g. of 5,7-dimethoxyindole - 3 - carboxaldehyde and 3.2 g. of ammonium acetate together with 70 ml. of 1-nitropropane. In this particular case, there were obtained 9.8 g. of 3-(2-ethyl-2-nitrovinyl)-5,7-dimethoxyindole, M.P. 173.5–175° C.

*Analysis.*—Calcd. for $C_{14}H_{16}O_4N_2$ (percent): C, 60.86; H, 5.84. Found (percent): C, 60.99; H, 5.61.

Following the procedure of Example II, 9.6 g. of the above indolylnitrobutene and 6.6 g. of lithium aluminum hydride in 300 ml. of tetrahydrofuran reacted to give 5.0 g. of 3-(2-aminobutyl)-5,7-dimethoxyindole as the free base, M.P. 123.5–129° C. After one recrystallization from toluene, the melting point was raised to 130°–131° C.

*Analysis.*—Calcd. for $C_{14}H_{20}O_2N_2$ (percent): C, 67.71; H, 8.12; N, 11.28. Found (percent): C, 67.95; H, 7.95; N, 11.44.

Example IV

The procedure described in Example II is employed again, only this time 5,7-dimethoxyindole-3-carboxaldehyde and 1-nitroisobutane react to afford 3-(2-n-propyl-2-nitrovinyl)-5,7-dimethoxyindole, which, in turn, is reduced by lithium aluminum hydride in tetrahydrofuran to yield 3-(2-aminoisoamyl)-5,7-dimethoxyindole. In addition, 5,7-dimethoxyindole-3-carboxaldehyde and nitromethane react to give 3-(2-nitrovinyl)-5,7-dimethoxyindole, which, in turn, is reduced by lithium aluminum hydride in tetrahydrofuran to give the same product later reported in Example IX, viz, 3-(2-aminoethyl)-5,7-dimethoxyindole.

Example V

To a solution consisting of 1.4 g. of glacial acetic acid containing 3.6 g. of 25% aqueous dimethylamine, there was added 750 mg. of 37% aqueous formaldehyde followed by 1.77 g. of 5,7-dimethoxyindole. The resulting solution was then allowed to stand for one hour at room temperature (~25° C.) before being slowly poured into 20 ml. of 10% aqueous sodium hydroxide solution. The soft solid material which formed at this point was then filtered from the aqueous mixture and subsequently suspended in isopropyl ether. After collecting the undissolved solids by means of filtrations, there were obtained 1.3 g. of 3 - dimethylaminomethyl - 5,7 - dimethoxyindole, M.P. 122–124° C. after recrystallization from a diethyl ether-pentane mixture.

*Analysis.*—Calcd. for $C_{13}H_{18}O_2N_2$ (percent): C, 66.64; H, 7.74; N, 11.96. Found (percent): C, 66.63; H, 7.80; N, 11.75.

Example VI

A solution containing 1.8 g. of 3-dimethylaminomethyl-5,7-dimethoxyindole and 220 mg. of sodium hydroxide in 10 ml. of nitroethane was heated to reflux for seven hours, while under a dry nitrogen atmosphere. At the end of this time, the reaction mixture was cooled to room temperature (~25° C.) and 100 ml. of diethyl ether were subsequently added thereto, followed by removal of the ether layer which was then washed successively with 30 ml. portions of 30% aqueous acetic acid, 15% aqueous ammonium hydroxide, water and finally, with saturated sodium chloride solution. The so-washed ether layer was then dried over anhydrous sodium sulfate and the solvent subsequently removed therefrom by means of evaporation under reduced pressure to give 1.6 g. of 3-(2-nitropropyl)-5,7-dimethoxyindole in the form of an oil.

The nitroalkylindole compound produced as described above was then dissolved in 20 ml. of tetrahydrofuran and added to a suspension of 2.8 g. of lithium aluminum hydride in 115 ml. of tetrahydrofuran. The resulting suspension was then heated to reflux for 24 hours and thereafter cooled to room temperature, followed by the addition of water and aqueous sodium hydroxide thereto in a careful manner. The solids which formed at this point were then removed by filtration and the resulting filtrate was thereafter concentrated in vacuo to afford an oily material, which was subsequently dissolved in diethyl ether. Upon the addition of sufficient hydrogen chloride dissolved in ethyl acetate to the aforementioned ethereal mixture, there was obtained 500 mg. of 3-(2-aminopropyl)-5,7-dimethoxyindole hydrochloride, M.P. 270° C. (dec.). One recrystallization of the product from isopropanol raised the melting point to 277° C. (dec.).

*Analysis.*—Calcd. for $C_{13}H_{18}O_2N_2 \cdot HCl$ (percent): C, 57.66; H, 7.07; N, 10.35. Found (percent): C, 57.69; H, 7.05; N, 10.32.

Example VII

The procedure described in Example VI was repeated only this time 2.3 g. (0.01 mole) of the 3-dimethylaminomethyl-5,7-dimethoxyindole intermediate was reacted with 14 ml. of 1-nitropropane to give 2.3 g. of 3-(2-nitrobutyl)-5,7-dimethoxyindole which, in turn, was reduced with 2.0 g. of lithium aluminum hydride dissolved in 90 ml. of tetrahydrofuran to yield 100 mg. of 3-(2-aminobutyl)-5,7-dimethoxyindole, M.P. 122–125° C.

Example VIII

The procedure described in Example VI is followed again, only this time to prepare the products of Example IV by reacting 3-dimethylaminomethyl-5,7-dimethoxyindole with nitromethane to give 3-(2-nitroethyl)-5,7-dimethoxyindole, which, in turn, is reduced by lithium aluminum hydride in tetrahydrofuran to yield 3-(2-aminoethyl)-5,7-dimethoxyindole. In like manner, 3-dimethylaminomethyl-5,7-dimethoxyindole and 1-nitrobutane react to afford 3 - (2-nitroamyl)-5,7-dimethoxyindole, which, in turn, is reduced by lithium aluminum hydride to give 3-(2-aminoamyl) - 5,7 - dimethoxyindole, while 3-dimethylaminomethyl-5,7-dimethoxyindole and 1 - nitroisobutane react to afford 3-(2-nitroisoamyl)-5,7-dimethoxyindole which, in turn, is reduced by lithium hydride to form 3-(2-aminoisoamyl)-5,7-dimethoxyindole.

Example IX

To a solution consisting of 4.0 g. of 5,7-dimethoxyindole dissolved in 100 ml. of diethyl ether, there were added 4.0 ml. of oxalyl chloride over a period of ten minutes, while keeping the reaction mixture at 0° C. After stirring for a further three hours at this same temperature, the resulting mixture was then concentrated in vacuo to 30 ml. and the resulting concentrate was subsequently treated with 50 ml. of petroleum ether to give a crude crystalline precipitate. The latter material, which is an acid chloride, was then collected by means of suction filtration and added to a solution consisting of 5.6 g. of dibenzylamine in 150 ml. of diethyl ether, followed by stirring for an additional period of two hours. The resulting reaction mixture was then filtered, and the solids so obtained were thereafter slurried in hot water and collected by suction filtration. In this manner, there was obtained dibenzyl - 5,7 - dimethoxyindoleglyoxamide, M.P. 178–179° C. after recrystallization from ethyl acetate-petroleum ether (yield, 5.4 g.).

*Analysis.*—Calcd. for $C_{26}H_{24}O_4N_2$ (percent): C, 72.88; H, 5.64; N, 6.54. Found (percent): C, 72.92; H, 5.53; N, 6.32.

Five grams of the above glyoxamide were then suspended in benzene and the resulting suspension was added, in small portions, to a solution consisting of 7.0 g. of lithium aluminum hydride dissolved in 700 ml. of diethyl ether. The resulting reaction mixture was then heated to reflux for three hours, and thereafter cooled to room temperature (~25° C.) and treated with 12.5 ml. of water. The solids which formed at this point were then removed by means of filtration, and the resulting filtrate was concentrated in vacuo to afford a residual material that was subsequently crystallized from benzene-petroleum ether to give 3.4 g. of 3-[2-(N,N-dibenzylamino) ethyl]-5,7-dimethoxyindole, M.P. 103–104° C.

*Analysis.*—Calcd. for $C_{26}H_{28}O_2N_2$ (percent): C, 77.97; H, 7.05; N, 7.00. Found (percent): C, 78.15; H, 7.03; N, 6.84.

Fifteen grams of the above dibenzylamine derivative were then dissolved in 200 ml. of ethanol containing 5 ml. of 12 N hydrochloric acid solution. To this mixture, there were then added 12 g. of 5% palladium-on-charcoal catalyst, followed by shaking for 24 hours in a dry hydrogen atmosphere at 50° C. and at 25 p.s.i. pressure. At the end of this time, the catalyst was removed by means of filtration and the solvent evaporated under reduced pressure to afford a residual material that was subsequently crystallized from methanol-ethyl acetate to give pure 3-(2-aminoethyl) - 5,7 - dimethoxyindole hydrochloride, M.P. 232–234° C.

Example X

The procedure described in Example II to prepare 3-(2-aminopropyl)-5,7-dimethoxyindole hydrochloride is followed here to form the corresponding hydrofluoride salt by merely substituting hydrogen fluoride gas for hydrogen chloride in the ethyl acetate solution used in treating the ethereal extract of the aforementioned organic base compound in the last step of said example. In this particular case, the final product obtained is actually 3-(2-aminopropyl)-5,7-dimethoxyindole hydrofluoride.

In like manner, 3-(2-aminobutyl)-5,7-dimethoxyindole and hydrogen fluoride react to afford 3-(2-aminobutyl)-5,7-dimethoxyindole hydrofluoride, while 3-(2-aminoethyl)-5,7-dimethoxyindole and hydrogen fluoride react to give 3-(2-aminoethyl)-5,7-dimethoxyindole hydrofluoride.

Example XI

Ten parts by weight of 3-(2-aminopropyl)-5,7-dimethoxyindole hydrochloride in 50 parts by volume of water is neutralized with 10 N sodium hydroxide solution. Extraction of the resulting aqueous solution with several portions of methylene chloride, followed by separation of the organic layer and its subsequent concentration under reduced pressure then affords 3-(2-aminopropyl)-5,7-dimethoxyindole as a free organic base compound.

In like manner, when any of the other 5,7-dimethoxytryptamine salts of this invention, like 3-(2-aminoethyl)-5,7-dimethoxyindole hydrofluoride reported in Example X, are each individually subjected to this very same reaction procedure, the corresponding free organic base compound is always the final product obtained.

Example XII

The non-toxic hydrohalide acid addition salts of each of the 5,7-dimethoxytryptamine bases reported previously in the preceding examples, viz, the hydrochloride, hydrobromide and hydriodide salts, are each individually prepared by first dissolving the respective organic base compound in absolute ether followed by introduction of the appropriate hydrogen halide gas into the reaction solution until saturation of same is complete with respect to said gas, whereupon the desired salt precipitates from said solution. The crystalline product so obtained is then recrystallized from acetone-diethyl ether to yield the pure hydrohalide salt. For instance, when 1.0 g. of 3-(2-aminobutyl)-5,7-dimethoxyindole is dissolved in anhydrous diethyl ether and dry hydrogen chloride gas is subsequently passed into the resulting reaction solution until saturation of same is complete with respect to said gas, there is obtained a crystalline precipitate of 3-(2-aminobutyl)-5,7-dimethoxyindole hydrochloride.

Example XIII

The nitrate, sulfate, phosphate, acid phosphate, acetate, lactate, citrate, acid citrate, tartrate, bitartrate, succinate, maleate, gluconate, saccharate, methanesulfonate, ethanesulfonate, benzenesulfonate, and p-toluenesulfonate salts of each of the 5,7-dimethoxytryptamine bases previously reported in Example XI and elsewhere are all each prepared by separately dissolving in a suitable amount of ethanol the proper molar amounts of the respective acid and the appropriate organic base and then mixing the two solutions together, followed by the addition of diethyl ether to the resulting reaction solution in order to effect precipitation of the desired acid addition salt therefrom. For instance, when equivalent amounts of 3-(2-aminopropyl)-5,7-dimethoxyindole and concentrated sulfuric acid react in accordance with this procedure, the corresponding final product obtained is 3-(2-aminopropyl)-5,7-dimethoxyindole hydrogen sulfate. In like manner, each of the other salts is similarly prepared.

Example XIV

A dry solid pharmaceutical composition is prepared by blending the following materials together in the proportions by weight specified below:

3 - (2 - aminopropyl)-5,7-dimethoxyindole hydrochloride _____ 50
Sodium citrate _____ 25
Alginic acid _____ 10
Polyvinylpyrrolidone _____ 10
Magnesium stearate _____ 5

After the dried composition is thoroughly blended, tablets are punched from the resulting mixture, each tablet being of such size that it contains 100 mg. of the active ingredient. Other tablets are also prepared in a similar manner containing 5, 10, 25 and 50 mg. of the active ingredient, respectively, by merely using the appropriate amount of the 5,7-dimethoxytryptamine salt in each case.

Example XV

A dry solid pharmaceutical composition is prepared by combining the following materials together in the proportions by weight indicated below:

3-(2 - aminobutyl) - 5,7 - dimethoxyindole hydrochloride _____ 50
Calcium carbonate _____ 20
Polyethylene glycol, average molecular weight 4000 __ 30

The dried solid mixture so prepared is then thoroughly agitated so as to obtain a powdered product that is completely uniform. Soft elastic and hard-filled gelatin capsules containing this pharmaceutical composition are then prepared, employing a sufficient quantity of material in each case so as to provide each capsule with 250 mg. of the active ingredient.

What is claimed is:

1. A 5,7-dimethoxytryptamine compound selected from the group consisting of indole bases of the formula:

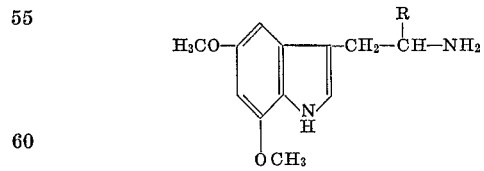

and the mineral and organic acid addition salts thereof, wherein R is a member selected from the group consisting of hydrogen and alkyl having from one to three carbon atoms.

2. A compound as claimed in claim 1 wherein R is hydrogen.

3. A compound as claimed in claim 1 wherein R is methyl.

4. A compound as claimed in claim 1 wherein R is ethyl.

5. A compound as claimed in claim 1 wherein R is n-propyl.

6. 3-(2-aminoethyl)-5,7-dimethoxyindole.

7. 3-(2-aminopropyl)-5,7-dimethoxyindole.
8. 3-(2-aminobutyl)-5,7-dimethoxyindole.

References Cited

UNITED STATES PATENTS 3,459,767  8/1969  McMannus _____ 260—326.15

FOREIGN PATENTS 888,413  1/1962  Great Britain _____ 260—326.15

OTHER REFERENCES

Rodighiero et al., Chem. Abs., vol. 56, 11541 (1962).

ALEX MAZEL, Primary Examiner
J. A. NARCAVAGE, Assistant Examiner

U.S. Cl. X.R.

260—326.13, 326.16; 424—274